Dec. 4, 1928.
W. J. McINNIS
1,693,722
PANORAMIC MOTION PICTURE CAMERA
Filed Aug. 26, 1925   3 Sheets-Sheet 1
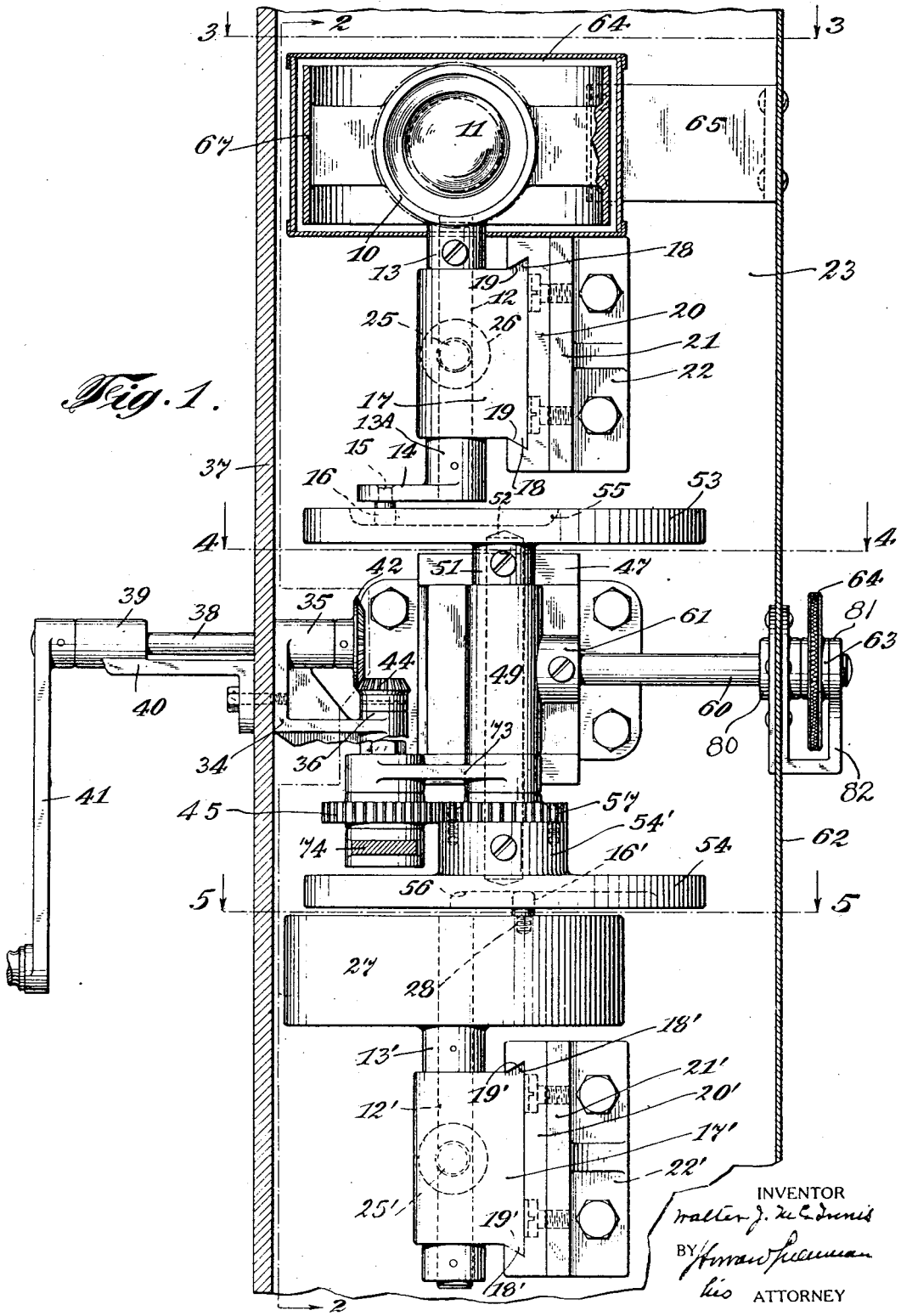

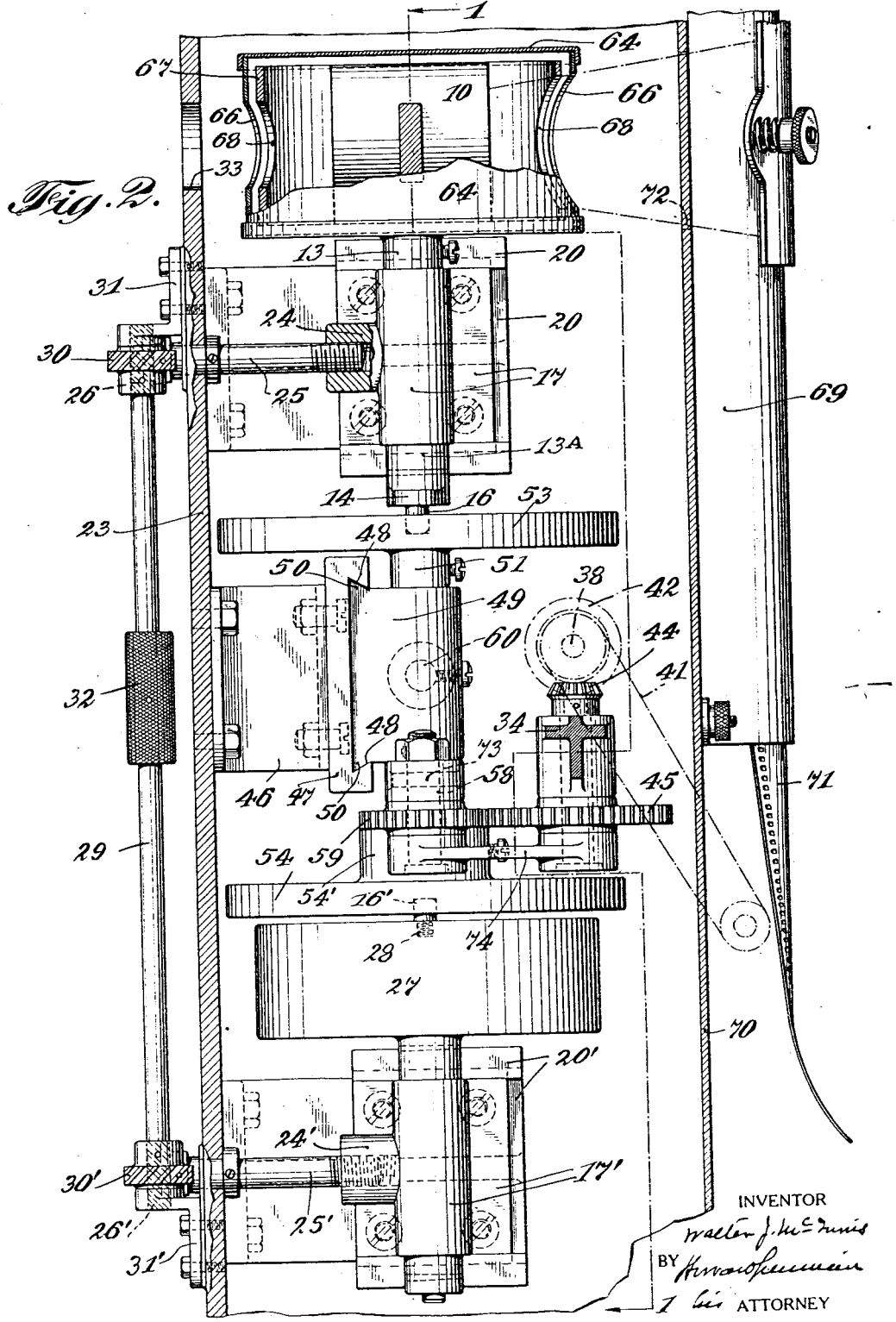

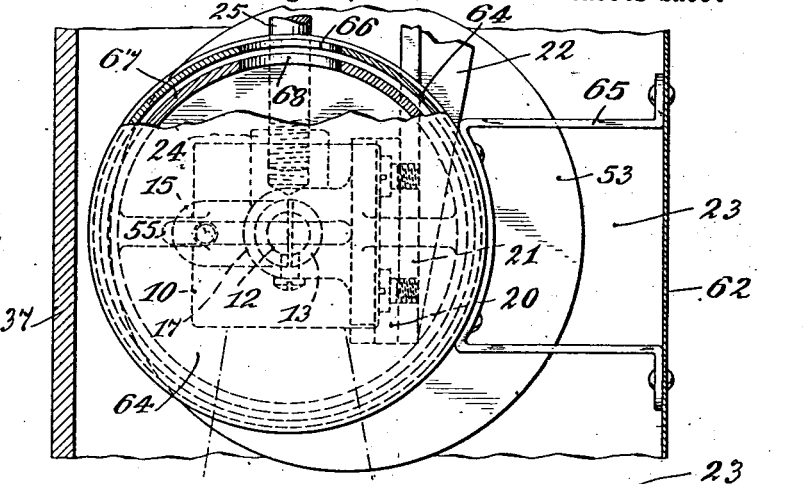
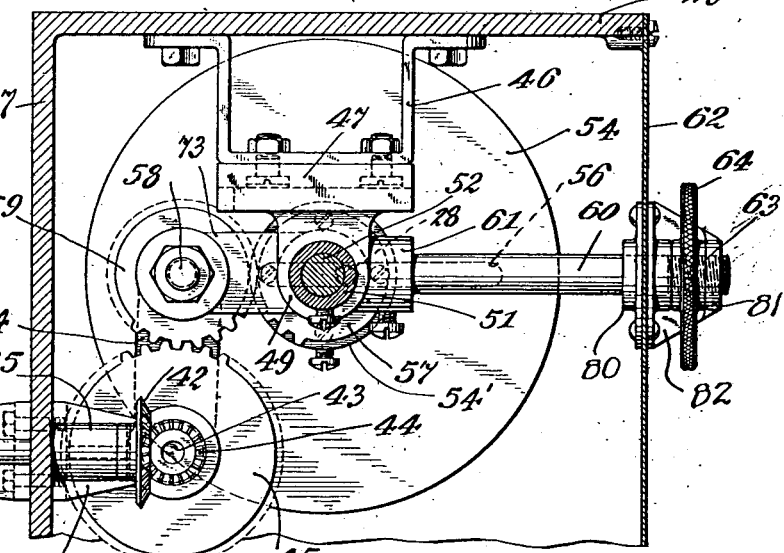
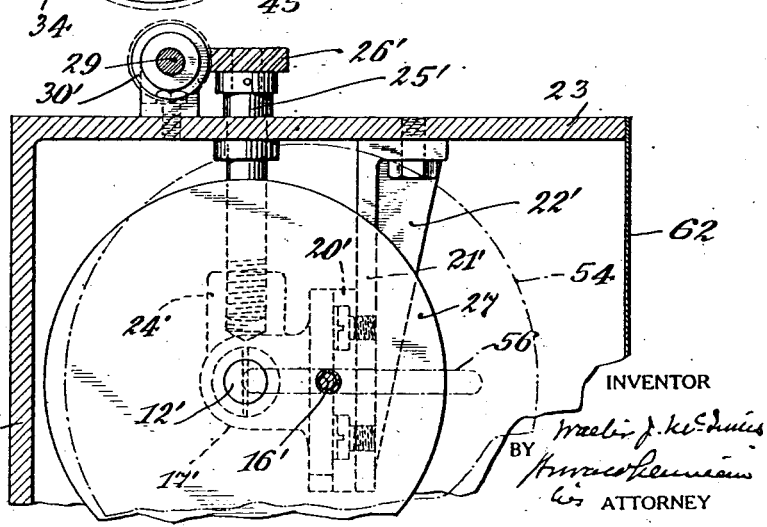

Patented Dec. 4, 1928.

1,693,722

UNITED STATES PATENT OFFICE.

WALTER J. McINNIS, OF STELTON, NEW JERSEY, ASSIGNOR TO WIDESCOPE CAMERA COMPANY, OF NEWARK, NEW JERSEY, A CORPORATION OF NEW JERSEY.

PANORAMIC MOTION-PICTURE CAMERA.

Application filed August 26, 1925. Serial No. 52,491.

My invention relates to motion picture devices and refers particularly to camera means having a revoluble lens.

In taking motion pictures, it is essential that there should be intermittent steps for the admission and prevention of admission of light to the lens and upon the film, in order that photographic images may be impressed during the admission period and the light interrupted to allow of the movement of the film to position for the next photographic image.

It has been suggested that this can be accomplished by having a revoluble lens within a housing so positioned, that during the revolution of the lens there may be intermittent light exposures with corresponding periods of light prevention.

The suggested devices of this character, however, have not been operative because of the peculiarities incident to the taking of motion pictures.

The aperture through which light passes into a camera is comparatively small, and hence, if during the revolution of the lens it sweeps across the apertures too rapidly, insufficient light will be admitted for the production of satisfactory photographic images. On the other hand, if the sweep of the lens across the light aperture is too slow, the moving objects will have an opportunity to change their positions during the photographic impression period, thus producing blurred results.

Further, if the slower movement of the lens past the aperture be continued for the entire revolution of the lens, the objects to be photographed will have moved too far between picture taking periods to produce a continuity of motion on the films.

It is to be noted, that if a lens revolves uniformly, its period of light exposure will be much less than that of the period during which the introduction of light is prevented, because only a comparatively small portion of the arc of complete revolution is used for exposure as compared with that of the non-exposed portion.

Practical experience has shown that if this revolution of the lens in the taking of motion pictures be uniform, either the period of light exposure will be too short for the impression of proper photographic images, or it will be so long in duration as to produce blurred images.

It is evident, therefore, that satisfactory results can be produced with a revoluble lens only by retarding the movement of the lens in its passage across the aperture as compared with its speed of revolution during the unexposed period and, as the driving shaft of a motion picture camera moves uniformly, it is evident that some mechanism must be introduced between the power shaft and the lens, in order to produce this intermittent retarded and accelerated revolution of the lens.

Further, as it is frequently necessary to change the focus of a motion picture camera during its actual operation, means must be employed whereby the focusing of the camera can be accomplished during the revolution of the revoluble lens.

Further, as the amount of light introduced into the camera during the exposure period is due to the intensity of outside light, it is evident that at times the period of lens sweep across the aperture should be greater or less in time than under other circumstances. Therefore, it is highly advisable that means should be employed whereby it is possible to change the relative intermittent retarded and accelerated movements of the lens during the actual operation of the device without any change in the speed of revolution of the power shaft.

All of these advantageous attributes, and others which will be evident upon a consideration of my specification, are incorporated within the device of my invention.

The device of my invention comprises a motion picture camera having a revoluble lens, the revolution of which is in a repeated series of retarded motions across the camera aperture and accelerated motions during the unexposed period of revolution, while the power shaft is revolving uniformly with means connected thereto whereby the lens may be focused during its revolution, and also means whereby the difference in speed of revolution of the lens between its exposed period and its unexposed period may be varied during the revolution of the lens, all of these operations being capable of accomplishment during uniform revolution of the power shaft.

In the accompanying drawings illustrating one form of the device of my invention, similar parts are designated by similar numerals.

Figure 1 is a cross-section on the line 1—1 of Figure 2.

Figure 2 is a cross-section on the line 2—2 of Figure 1.

Figure 3 is a cross-section on the line 3—3 of Figure 1.

Figure 4 is a cross-section on the line 4—4 of Figure 1.

Figure 5 is a cross-section on the line 5—5 of Figure 1.

The particular form of the device of my invention, shown in the accompanying drawings, comprises a lens housing 10, carrying a lens 11, fixedly attached to the revoluble shaft 12 fixedly attached to and within the collar 13. The free end of the shaft 12 is fixedly attached to the collar 13$^A$ which carries the arm 14, which in turn carries the pin 15 having a revoluble roller 16 thereon.

The collar 13 is maintained revolubly by the bearing 17, the tongues 18, 18 of the bearing 17 being movable within recesses 19, 19 of the plate 20. The bearing 17, therefore, is slidable along the plate 20, the latter being bolted to the bracket 21, the angled portion of which 22, is bolted to the front 23 of the camera casing.

The hub 24 of the bearing 17, has a threaded engagement with shaft 25 passing through the front 23 of the casing and carrying the helical gear 26.

Within the casing and spaced from the above described device is a similar device, the corresponding parts being indicated by prime numerals. In this device the sleeve 13′ carries a fly-wheel 27 in which a pin 28 is screwed, said pin 28 carrying the roller 16′. The fly-wheel 27 is a counter weight for the lens housing 10, the lens 11 and the housing 67.

A revoluble shaft 29 carries the helical gears 30 and 30′ meshing with the helical gear 26 and 26′ and being supported by the bracket arms 31 and 31′. The shaft 29 has a knurled member 32 for purposes of ease of revolution.

It is evident that a revolution of the shaft 29 will revolve the shafts 25 and 25′ causing the bearings 17 and 17′ to move across the brackets 20 and 20′, thus moving the lens 11 and allowing the latter to be properly focused through the aperture 33 upon the object, or objects, to be photographed.

Positioned between the two devices, above described, is an angular bracket 34 carrying the two bearings 35 and 36, the bracket 34 being fixedly attached to the casing side 37. Revoluble within the bracket 35 is a shaft 38 extending through the casing side 37 and revoluble within the bracket 39 supported by the bracket 40 attached to the side 37, an arm 41 being fixedly attached to the shaft 38. The shaft 38 carries the bevel gear 42.

A stub shaft 43 revoluble within the bearing 36 carries the bevel gear 44 meshing with the bevel gear 42, and also carries the gear 45.

Fixedly attached to the casing front 23 is a bracket support 46 to which is fixedly attached a plate 47 having recesses 48, 48. Slidable upon the plate 47 is a bearing 49, the tongues 50, 50 of which fit within the recesses 48, 48 of plate 47. Revoluble at one end of the bearing 49 is a collar 51 fixedly attached to the shaft 52, to which are fixedly attached the two annular members, or discs, 53 and 54, the latter having the integral hub 54′. The roller 16 is within the groove 55 of the annular member 53 and the roller 16′ is within the groove 56 of the annular member 54.

Fixedly attached to the hub 54′ is the gear 57.

A stub-shaft 58 carries the idler gear 59 meshing with the gears 45 and 57. The stub shaft 58 is supported by the link support 73 carried by the shaft 52 and the link support 74 carried by the shaft 43.

A rod 60 is fixedly attached to the collar 61 of the bearing 49 and extends through the casing side 62. The outer extremity 63 of the rod is threaded and carries the threaded knurled wheel 64. The wheel 64 is maintained from longitudinal movement along the rod 60 by means of the collar 80 carried by the casing side 62 and the collar 81 integral with the support 82, the latter being carried by the casing side 62.

The revolution of the wheel 64 moves the rod 60 inwardly and outwardly carrying the bearing 49 and its attached parts. This movement causes a corresponding movement of the gears 57 and 59, and as the latter is an idler, it will ride over the gear 45 in meshment, thus causing the revolution of the gear 45 produced by the revolution of the handle 41 to revolve the gear 57 irrespective of the position of these two gears with respect to each other.

It is to be noted that the slidable movement of the bearing 49 is at right angles to that of the bearings 17 and 17′.

The shafts 12 and 12′ are in exact alignment with each other, while they are out of alignment with the shaft 52, thus causing a cam movement effect to the shafts 12 and 12′ during the uniform movement of the driving shaft 38. If the shafts 12, 12′ and 52 were in alignment, the revolution of the lens 11 would be uniform with a uniform revolution of the driving shaft 38, but the further the shaft 52 is from alignment with the shafts 12, 12′ the greater will be the difference in speed of revolution of the lens 11 during a complete revolution. As a result thereof, a uniform revolution of the driving shaft 38 does not produce a uniform revolution of the lens 11 but causes an intermittent retarded and accelerated movement, a portion of the revolution of the driving shaft producing a much more rapid revolution of the lens than is produced by the remaining portion of the driving shaft revolution.

If, therefore, the elements of the device are properly arranged with respect to each other, the lens will move more slowly during the exposure period than it will during the unexposed period, thus allowing of a rapid return of the lens to an operative position, although the driving shaft is being revolved at a uniform speed.

This relative difference in the lens revolution may be changed by moving the rod 60 inwardly or outwardly, thus changing the position of the shaft 52 to the shafts 12 and 12' and causing a variation at the time of cam movement.

For clearness and sharpness of photographic image impression, I employ a stationary hood 64 carried by the bracket 65 attached to the casing side 62 and having opposed apertures 66, 66 and an inner hood 67 revoluble with the lens housing 10, having the opposed apertures 68, 68.

A curved film guide 69 attached to the casing back 70, guides the film 71 intermittently past the aperture 72.

The operation of the device is as follows:—

The uniform revolution of the driving shaft 38 causes a slow revoluble movement of the lens 11 while it is passing across the aperture 33, that is during the picture impression period, and then rapidly during the remainder of its revolution, that is during the period when picture impressions are not being made. This difference in speed of revolution during a complete revolution of the lens may be varied by revolving the knurled wheel 64, thus changing the actual relationship between shafts 12, 12' and the shaft 52, and this changed relationship of speed may be made while the camera is in operation. The lens is focused by turning the knurled member 32 and the focusing operation may be accomplished while the camera is in operation.

From the above, it will be noted, that in my device the speed of the passage of the lens across the camera aperture may be much slower than its speed during the period in which it is being revolved around to a position for the next photographic image impression and that this relationship may be varied to suit the particular requirements, this intermittent retarded and accelerated movement being accomplished by a uniform speed of revolution of the driving shaft; and further, that the lens may be readily adjusted to any particular condition of focus, all being capable of accomplishment during the revolution of the driving shaft.

I have not shown a shutter for the interruption of the light admittance to the lens, as these are well-known and employed with all cameras of this description and hence any suitable means may be employed for this purpose.

I do not limit myself to the particular size, shape, number or arrangement of parts as shown and described as these are given simply as a means for describing the device of my invention.

What I claim is:—

1. In a motion picture camera, in combination, a revoluble lens, means for completely revolving the lens and means whereby the speed of revolution of the lens will be varied during each revolution thereof while the revolving means maintains a uniform speed of revolution.

2. In a motion picture camera, in combination, a revoluble lens, means for completely revolving the lens and means whereby the speed of revolution of the lens will be alternately retarded and accelerated during a uniform revolution of the revolving means.

3. In a motion picture camera, in combination, a revoluble lens, means for completely revolving the lens and means whereby the speed of revolution of the lens will be alternately retarded and accelerated during each revolution of the lens while the revolving means maintain a uniform speed of revolution.

4. In a motion picture camera, in combination, a revoluble lens, means for completely revolving the lens, means whereby the speed of revolution of the lens will be alternately retarded and accelerated during a uniform revolution of the revolving means and means for varying the relationship between the retarded and accelerated speeds of the lens.

5. In a motion picture camera, in combination, a revoluble lens, means for completely revolving the lens, means whereby the speed of revolution of the lens will be alternately retarded and accelerated during a uniform revolution of the revolving means and means for carrying the relationship between the retarded and accelerated speeds of the lens during the revolution of the lens.

6. In a motion picture camera, in combination, a casing having a light aperture therein, means for carrying an intermittently moving film, a revoluble lens housing between the light aperture and a film, a lens within the housing for making photographic images upon a film, means for completely revolving the lens housing allowing the making of photographic images during the exposure period and preventing the making of photographic images during the unexposed period, and means whereby the revolution of the housing will be slower during the exposure period than during the unexposed period while the speed of revolution of the revolving means remains uniform.

7. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform and means for varying the relationship of the speed of the housing during the exposed period to the speed of the housing during the unexposed period.

8. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform, means for varying the relationship of the speed of the housing during the exposed period to the speed of the housing during the unexposed period during the revolution of the housing.

9. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform and means for focusing the lens.

10. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform and means exterior of the casing for focusing the lens during its revolution.

11. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform, means for varying the relationship of the speed of the housing during the exposed period to the speed of the housing during the unexposed period and means for focusing the lens.

12. In a motion picture camera, in combination, a casing having a light aperture therein, means for carrying an intermittently moving film, a revoluble lens housing between the light aperture and a film, a lens within the housing for making photographic images upon a film, means for revolving the lens housing allowing the making of photographic images during the exposure period and preventing the making of photographic images during the unexposed period, means whereby the revolution of the housing will be slower during the exposure period than during the unexposed period while the speed of revolution of the revolving means remains uniform. means for varying the relationship of the speed of the housing during the exposed period to the speed of the housing during the unexposed period during the revolution of the housing and means for focusing the lens during the revolution of the lens.

13. In a motion picture camera, in combination, a casing having a light aperture therein, means for carrying an intermittently moving film within the casing, a revoluble lens between the light aperture and a film, a housing carrying the lens, a revoluble shaft carrying the housing, an arm carried by the housing shaft, an extended pin carried by the housing shaft arm and movable within a recess in a main revoluble member, a main revoluble member having a recess therein, the axis of the housing shaft being in nonalignment with the axis of the main revoluble member and a driving shaft for the main revoluble member, whereby a uniform revolution of the driving shaft will cause an intermittent speed revoluble movement to the lens.

14. In a motion picture camera, in combination, a casing having a light aperture therein, means for carrying an intermittently moving film within the casing, a revoluble lens between the light aperture and a film, a housing carrying the lens, a revoluble shaft carrying the housing, an arm carried by the housing shaft, an extended pin carried by the housing shaft arm and movable within a recess in a main revoluble member, a main revoluble member having a recess therein, the axis of the housing shaft being in non-alignment with the axis of the main revoluble member, a driving shaft for the main revoluble member, whereby a uniform revolution of the driving shaft will cause an intermittent speed revoluble movement to the lens and means whereby the position of the axis of the housing shaft with respect to the axis of the main revoluble member may be changed causing a variation in the relationship of the intermittent movements of the lens.

15. In a motion picture camera, in combination, a casing having a light aperture therein, means for carrying an intermittently moving film within the casing, a revoluble lens between the light aperture and a film, a housing carrying the lens, a revoluble shaft carrying the housing, an arm carried by the housing shaft, an extended pin carried by the housing shaft arm and movable within a recess in a main revoluble member, a main revoluble member having a recess therein, the axis of the housing shaft being in non-alignment with the axis of the main revoluble member, a driving shaft for the main revoluble member, whereby a uniform revolution of the driving shaft will cause an intermittent speed revoluble movement to the lens, means whereby the position of the axis of the housing shaft with respect to the axis of the main revoluble member may be changed causing a variation in the relationship of the intermittent movements of the lens and means for focusing the lens.

Signed at New York city in the county of New York and State of New York this 9th day of July, 1925.

WALTER J. McINNIS.